E. F. SHAW.
Churn.
No. 80,021.  Patented July 14, 1868.
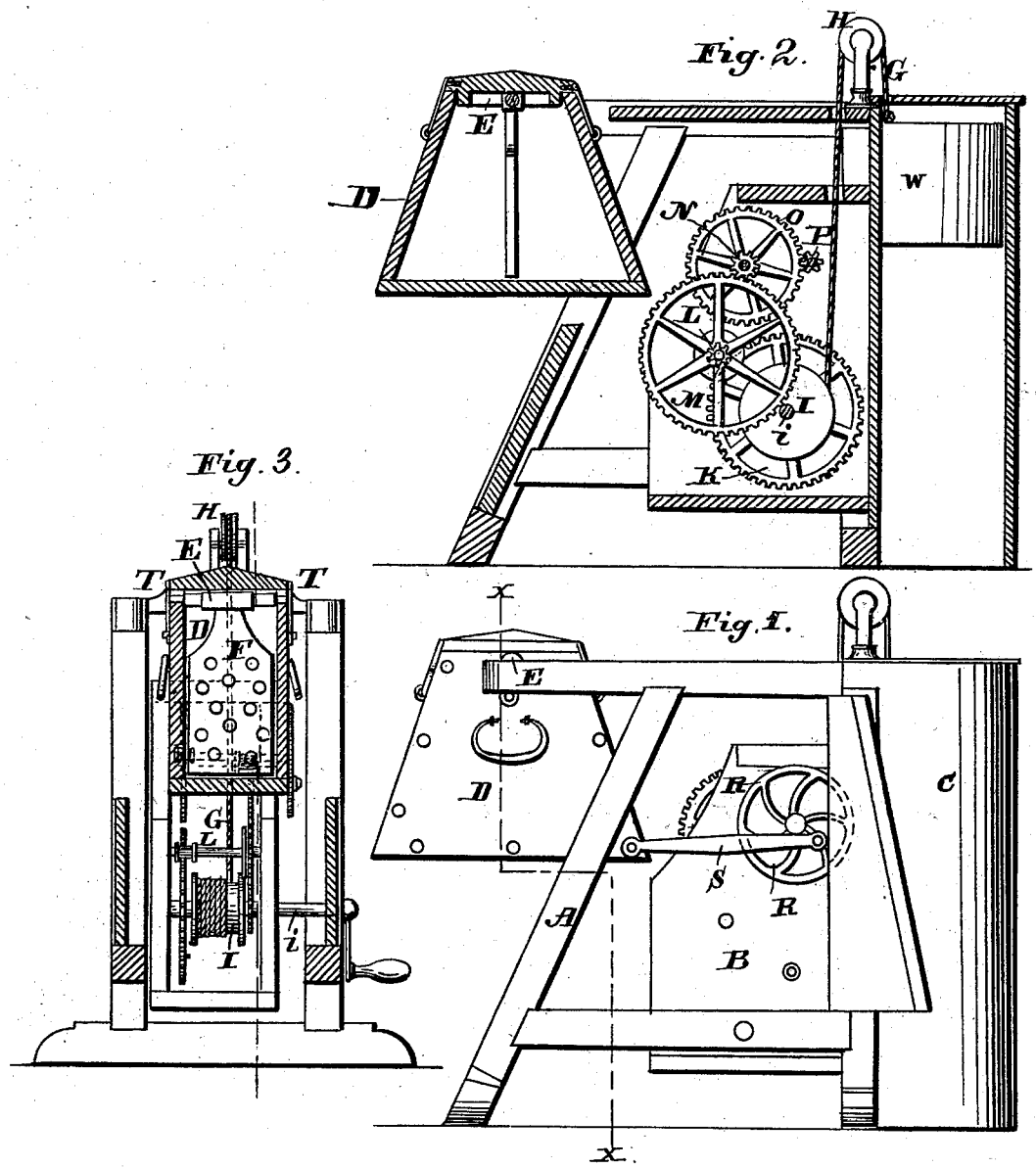

United States Patent Office.

EUGENE F. SHAW, OF WYOMING, MICHIGAN.

Letters Patent No. 80,021, dated July 14, 1868.

---

IMPROVEMENT IN CHURN.

---

The Schedule referred to in these Letters Patent and making part of the same.

---

TO ALL WHOM IT MAY CONCERN:

Be it known that I, EUGENE F. SHAW, of Wyoming, in the county of Kent, and State of Michigan, have invented a new and useful Improvement in Churns; and I do hereby declare that the following is a full and exact description thereof, reference being had to the accompanying drawings, and to the letters of reference marked thereon.

My invention relates to that class of churns which are moved by means of gear-wheels, and consists in a peculiar arrangement and combination of gear-wheels, pinions, weight, and oscillating-churn or cream-vessel. In the accompanying drawings—

Figure 1 represents the front view of my churn.

Figure 2 is a vertical longitudinal section of the same.

Figure 3 is a vertical cross-section of the same, upon red line x x, fig. 1.

In the construction of my churn, a suitable frame, A, fig. 1, is first made, with a box B and C for enclosing the gearing and weight. Upon this frame is suspended a cream-vessel, D, by means of a cross-bar, E. This cream-vessel is provided with a dasher, F, which is held in a perpendicular position, by means of the cross-bar E, which is provided with hooks F, for supporting the vessel D upon the shaft, and detaching the same when desired.

The churn or cream-vessel is swung back and forth by means of a weight, W, fig. 2, in connection with the gear-wheels and pinion now to be described.

A cord, G, passes over the pulley-wheel H, to the spool I, upon which the cord may be wound by a key upon the shaft $i$, fig. 1, thus elevating the weight, as seen in fig. 2. This shaft $i$ carries a gear-wheel, K, which engages the pinion L, thus multiplying the motion of this pinion, and the gear-wheel M, which engages a second pinion, N, upon the shaft of gear-wheel O, which engages another pinion P, upon the shaft of the crank-wheel, R, fig. 1. The motion thus three times multiplied, is transferred from the crank-wheel to the cream-vessel, by means of the connecting-rod S, fig. 1.

The operation is as follows. The cream or milk being put into the vessel D, the weight W is wound up, and then left to move the gear-wheels and do the churning, while the dairy-women may attend to other duties until the butter comes.

The size of the weight W may be varied according to circumstances, thus regulating the power and speed at pleasure. The butter collects in two rolls, one each side of the dasher.

I do not broadly claim the use of gear-wheels, pinions, and a weight, for operating churns automatically, but confine my claims to the peculiar arrangement and combination above described.

Having thus fully described my invention—

I claim the oscillating-vessel D, provided with the cross-bar E and dasher F, in combination with the gear-wheels K M O, and their shafts and pinions, and the spool I, cord G, and weight W, all arranged and operating substantially in the manner specified.

EUGENE F. SHAW.

Witnesses:
G. C. PEIRCE,
P. R. L. PEIRCE.